United States Patent
Tamura

[11] 3,741,014
[45] June 26, 1973

[54] ULTRASONIC CURRENT METER
[75] Inventor: Kohzoh Tamura, Chigasaki, Japan
[73] Assignee: Kabushiki Kaisha Tokyo Keiki, Ohta-ku, Tokyo, Japan
[22] Filed: June 16, 1971
[21] Appl. No.: 153,559

[30] Foreign Application Priority Data
June 25, 1970 Japan.............................. 45/55416

[52] U.S. Cl. .............................. 73/194 A, 73/67.7
[51] Int. Cl. ........................... G01f 1/00, G01p 5/00
[58] Field of Search ........................... 73/194 A, 181

[56] References Cited
UNITED STATES PATENTS
2,770,795  11/1956  Peterson ..................... 73/194 A UX
2,841,775   7/1958  Saunders........................... 73/181 X
2,908,888  10/1959  Kirland ......................... 73/194 A X
3,230,766   1/1966  Kallmann........................... 73/194 A

FOREIGN PATENTS OR APPLICATIONS
925,541  5/1963  Great Britain................... 73/194 A Primary Examiner—Charles A. Ruehl
Attorney—Carlton Hill, J. Arthur Gross et al.

[57] ABSTRACT

An ultrasonic current meter having an ultrasonic transmitter, an ultrasonic receiver, an oscillator for supplying a signal of a predetermined frequency to the ultrasonic transmitter to emit ultrasonic waves therefrom, a circuit for generating a signal of a Doppler frequency by combining a signal corresponding to the ultrasonic waves reflected by objects contained in a fluid to be measured but different in acoustic impedance from the fluid with a signal derived from the oscillator and an indicator device for indicating the flow rate of the fluid in accordance with the signal of the Doppler frequency, in which the ultrasonic transmitter and receiver have devices for controlling the ultrasonic waves transmitted and received mounted adjacent the transmitter and receiver, respectively, thereby to ensure accurate measurement of the flow rate of the fluid.

2 Claims, 6 Drawing Figures

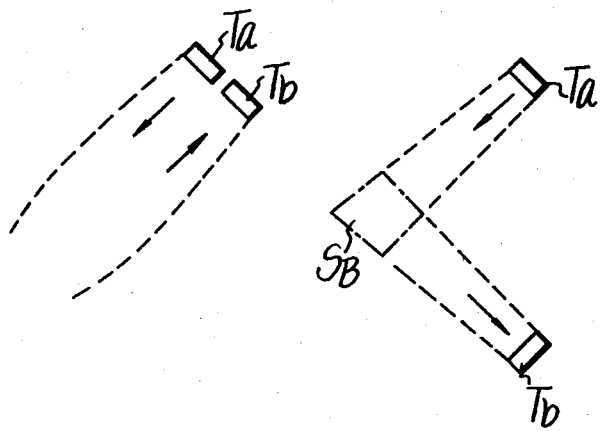
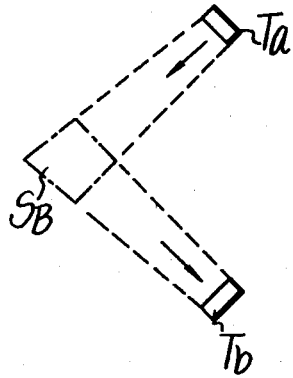
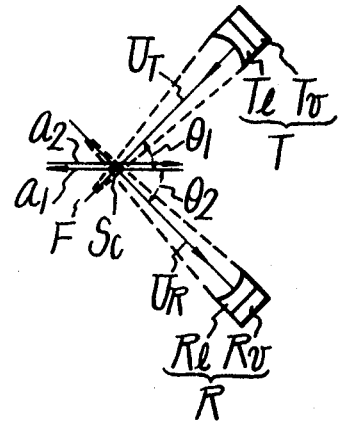
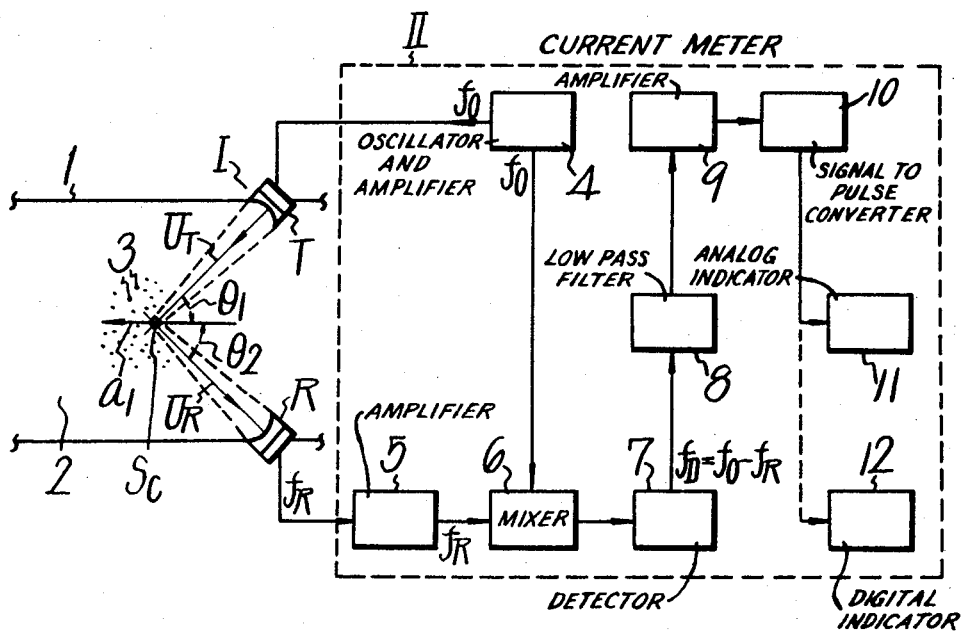

3,741,014

ULTRASONIC CURRENT METER

BACKGROUND OF THE INVENTION

1. Field of the Invention

The present invention relates to an ultrasonic current meter, and more particularly to an ultrasonic current meter of the type which emits ultrasonic waves towards dust, floating matter or like objects contained in a fluid to be measured and which have different acoustic impedance from that of the fluid and which reflect the ultrasonic waves. The reflected waves are detected and the Doppler effect imparted by the objects to the emitted and reflected waves is used for measuring the flow rate of the fluid.

Description of the Prior Art

Previously a method which utilizes the Doppler effect of the ultrasonic waves for measuring the travelling speed of a target such as a ship or the like or the travelling speed of the ultrasonic wave source has been known. This known method employs an ultrasonic transmitter and receiver, T$a$ and T$b$, mounted side by side as shown in FIG. 1. The receiver T$b$ receives ultrasonic waves transmitted from the transmitter T$a$ which have been reflected by a ship or the like moving at a certain velocity and measures the Doppler frequency from the received ultrasonic waves to obtain the travelling speed of the ship or the like. With such an instrument, however, the Doppler frequency received from fine particles contained in a fluid varies over a wide range if the solid angle of the ultrasonic waves is great because the ultrasonic waves strike against fine particles having different velocities. Thus, the Doppler frequency obtained from the reflected waves is also distributed over a wide range. Thus, prior art current meters cannot measure the velocity of a fluid with great accuracy. In order to obtain more precise measurements with Doppler frequency, the known instrument requires a very complicated and expensive analyzing circuit.

In the case where the ultrasonic transmitter and receiver T$a$ and T$b$ are mounted apart from each other as depicted in FIG. 1B, ultrasonic waves emitted from the transmitter T$a$ and directed toward fine particles or the like collide with fine particles having different velocities over a considerably wide range $S_B$, and the resulting Doppler frequency is also changed or distributed over a wide range as in the foregoing example. Accordingly, a complicated and expensive analyzing circuit is required for accurate measurement of the moving velocities of the fine particles or the like in the fluid as in the example of FIG. 1A.

Further, since the velocity of sound (ultrasonic wave) varies with temperature changes of a medium through which it propagates, conventional ultrasonic current meters utilizing the sound wave give inaccurate results because the Doppler frequency varies with temperature change of the medium.

SUMMARY OF THE INVENTION

The primary object of this invention is to provide an ultrasonic current meter which is free from the aforementioned defects experienced in the prior art.

Another object of this invention is to provide an ultrasonic current meter which utilizes objects contained in a fluid which have an acoustic impedance different from that of the fluid.

Another object of this invention is to provide an ultrasonic current meter which is capable of measuring the flow rate of a fluid by utilizing fine particles of, for example, a cleanser, cleaning agent or the like mixed into and flowing at substantially the same velocity as the fluid, and which has an acoustic impedance different from that of the fluid.

Another object of this invention is to provide an ultrasonic current meter in which lens means are mounted ahead of an ultrasonic transmitter and a receiver respectively to ensure accurate measurement of the flow rate of a fluid.

Another object of this invention is to provide an improved ultrasonic current meter in which focusing type lenses are mounted in front of an ultrasonic transmitter and a receiver, respectively.

Still another object of this invention is to provide an improved ultrasonic current meter in which prism means are mounted in front of an ultrasonic transmitter and a receiver, respectively.

Other objects, features and advantages of this invention will become apparent from the following description taken in conjunction with the accompanying drawings.

BRIEF DESCRIPTION OF THE DRAWING

FIGS. 1A and 1B are schematic diagrams, respectively, showing arrangements of an ultrasonic transmitter and receiver employed in conventional ultrasonic current meters;

FIG. 1C is a schematic diagram illustrating the arrangement of an ultrasonic transmitter and receiver used in the present invention;

FIG. 2 is a schematic diagram showing one example of an ultrasonic current meter of the present invention.

DESCRIPTION OF THE PREFERRED EMBODIMENTS

Figure 3:
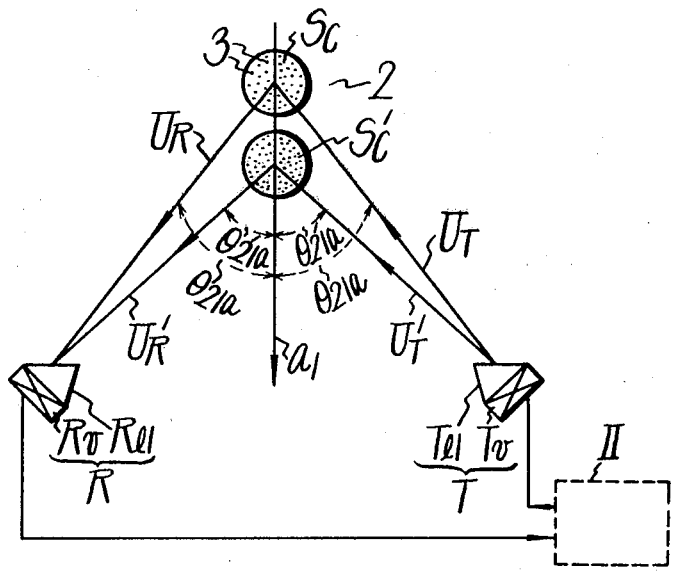
FIGS. 3 and 4 are similar schematic diagrams illustrating modified forms of the ultrasonic current meter of the present invention.

With reference to FIG. 1C, one example of this invention will hereinafter be described. In the present invention an ultrasonic transmitter T includes an oscillator diaphragm or transducer T$v$ and a focusing lens T$_l$. An ultrasonic receiver R includes a receiving oscillator diaphragm or transducer R$v$ and a focusing lens R$_l$. The ultrasonic transmitter and receiver T and R are mounted on opposite sides of a stream of a fluid F as depicted in the figure. The ultrasonic transmitter T is mounted so that the angle $\theta_1$ between the beam direction U$_T$ of ultrasonic waves emitted by the oscillator transducer T$v$ and focused by the focusing lens T$_l$ and the flow direction $a_1$ (or $a_2$) of the fluid F is smaller than 90°. The ultrasonic receiver R is mounted so that the angle $\theta_2$ between the beam direction U$_R$ of the ultrasonic waves focused by the focusing lens R$_l$ received on the oscillator transducer R$v$ and the flow direction $a_1$ (or $a_2$) of the fluid F is smaller than 90°. In this case, an area Sc where the beams U$_T$ and U$_R$ of the ultrasonic waves cross each other is made as small as possible by controlling the focusing of the ultrasonic waves emitted by the ultrasonic transmitter T and the wave receiving range of the ultrasonic receiver R. In the small area Sc of the crossing beams, the fluid and particles in the fluid can be considered to have substantially the same speed relative to each other. Also the particles can also be considered to have substantially the same speed relative to one another. Thus, any particles in the fluid F at area Sc cause substantially no fluctuation in the Doppler frequency of the ultrasonic waves which are emitted from the ultrasonic transmitter T, reflected by the particles and fluid in the area $S_c$ and received by the ultrasonic receiver R. The particles may be as small as, or smaller than, 40 microns.

FIG. 2 illustrates one example of the current meter of this invention employing an ultrasonic transmitter T and a receiver R.

In FIG. 2, reference numeral I indicates an ultrasonic transmitting and receiving section of the current meter of this invention. The transmitting and receiving section I includes a pipe 1 in which the ultrasonic transmitter T and receiver R are mounted in opposite walls of the pipe as above described. A fluid 2 to be measured flows in the pipe 1. The directions of the beams $U_T$ and $U_R$ of the transmitter T and receiver R are respectively inclined at suitable angles, for example, $\theta_1$ and $\theta_2$ with respect to the flow direction $a_1$ of the fluid 2 so that the ultrasonic beams $U_T$ and $U_R$ of the transmitter T and receiver R cross each other at the point Sc in the fluid 2 as previously described. Reference numeral II designates a measuring section of the current meter and includes an oscillator and amplifier 4. The oscillator 4 oscillates at a reference frequency $f_0$ and its output is fed to the transmitter T to cause its transducer Tv to emit ultrasonic waves at a frequency $f_0$. The output signal of oscillator 4 at a frequency $f_0$ is also applied to a mixer 6. Due to the focusing lens $T_l$, the ultrasonic waves from transmitter T are emitted in the form of a focused beam into the fluid 2 in the direction $U_T$. The ultrasonic waves are reflected by particles 3 contained in the fluid 2. The ultrasonic waves reflected by the particles 3 received at the receiver R are only those waves which are reflected by the particles 3 contained in the area Sc in which the beams $U_T$ and $U_R$ cross each other. This is accomplished by focusing the beams of the transmitter T and receiver R at the angles $\theta_1$ and $\theta_2$. The flow rates of the particles 3 within the area Sc in the fluid 2 can be regarded as substantially equal to one another and this causes very little fluctuation in the frequency $f_R$ derived from the ultrasonic waves at the receiver R. The receiver R converts the signal having a frequency $f_R$ into an electric signal and which is supplied to an amplifier 5. The output of the amplifier 5 is supplied to the mixer 6. The mixer 6 mixes the signal $f_R$ supplied thereto from the amplifier 5 with the signal $f_0$ fed thereto from the oscillator 4. The output of the mixer 6 is applied to a detector 7 which detects the Doppler frequency $f_D$. The frequency $f_D$ is $f_0-f_R$, which is proportional to the velocity of the particles 3 in the fluid 2. The output of the detector 7 is supplied to a low-pass filter 8 which passes signal components having low frequency such as the Doppler frequency $f_D$. An amplifier 9 receives the output of filter 8 and provides a signal to drive an indicator. A signal-to-pulse converter 10 receives the signal $f_D$ from the amplifier 9 and converts it into a pulse train at the same frequency.

The output signal of the converter 10 may be presented in analog form. The output pulse train of the converter 10 is supplied to a monostable multivibrator which produce pulses of a predetermined pulse width. The pulses are converted into an analog signal by an integrator circuit consisting of a capacitor and a resistor and then the signal of the frequency $f_D$ is multiplied by the scale factor of the flow rate of the fluid 2 to provide an analog output signal. These operations are achieved by a block identified as analog indicator 11. It is also possible to provide the indication in digital form. The output pulse train of the converter 10, which is proportional to the Doppler frequency $f_D$, may be multiplied by the scale factor and converted into a binary decimal code to provide a digital output signal. Block 12 represents such digital indicator.

The relationships among the transmitting frequency $f_0$, the flow rate V of the fluid 2, the velocity C of sound in the fluid 2 at a temperature T°C., the angle $\theta_1$ between the beam $U_T$ of the ultrasonic waves in the fluid 2 and $a_1$ of the fluid 2 and the Doppler frequency $f_D$ are given by the following Equation (1):

$$f_D = 2V \cdot \cos \theta_1 \cdot f_0/C \quad (1)$$

In this case, $\theta_1 = \theta_2$.

In the embodiment of this invention shown in FIGS. 1C and 2, the focused ultrasonic beam is caused to irradiate objects within a very small area Sc which can be regarded as a point so that a single Doppler frequency will be obtained which indicates the flow rate of the fluid as previously described. Therefore, the present invention is highly advantageous in that the flow rate can be accurately measured with a simple circuit.

Figure 4:
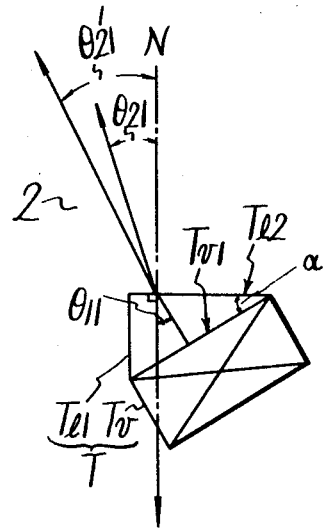

FIGS. 3 and 4 illustrate another modified form of this invention. In these figures, reference numerals corresponding to those in FIGS. 1 and 2 indicate the same elements. Further, the measuring current meter section II is identical in construction to that in the example of FIG. 2 and its details are not repeated.

In FIGS. 3 and 4 a pair of prism-like lenses $T_{l1}$ and $R_{l1}$ are mounted in front of the oscillator transducer Tv and Rv of the ultrasonic transmitter T and receiver R instead of the focusing lenses $T_l$ and $R_l$, respectively, used in the FIG. 2 embodiment.

As will be seen from the foregoing Equation (1), even if the flow rate V of the fluid 2 and the oscillation frequency $f_0$ of the oscillating amplifier 4 remain constant, a change in the velocity C of sound in the fluid 2 causes a change in the Doppler frequency $f_D$ which will introduce inaccuracy in the measurement of the flow rate V of the fluid 2.

Since the flow rate V of the fluid 2 and the oscillation frequency $f_0$ are constant irrespective of temperature changes of the fluid 2, the Equation (1) can be rewritten as follows:

$$f_D = KV (\cos \theta_1/C) \quad (2)$$

where $K = 2f_0 = $ a constant.

Accordingly, if the value of $\cos\theta_1$ is changed in proportion to the velocity C of sound in the fluid in a manner to hold $\cos \theta_1/C$ substantially constant in the case of temperature changes of the fluid 2, the Doppler frequency $f_D$ becomes independent of changes in the velocity C of sound in the fluid. Then even if the temperature of the fluid 2 varies from T°C. to T'°C. and the velocity of C of sound changes to C', the Doppler frequency $f_D$ remains substantially constant.

The example of the present invention shown in FIGS. 3 and 4 employs the above principle.

In the present invention in front of the transmitter T and receiver R are mounted layers $T_{l1}$ and $R_{l1}$ of a material such as, for example, acrylate resin in which the velocity of sound is different from that in the fluid 2 as set forth above.

Since the ultrasonic transmitter T and receiver R are identical in construction with each other, the aforementioned principle will be described with reference to FIG. 4 in which only the transmitter T is shown. Reference character N indicates a line normal to the front surface $T_{l2}$ of the layer $T_{l1}$. If the incidence angle of the ultrasonic waves to the front surface $T_{l2}$ of the layer $T_{l1}$ is taken as $\theta_{11}$, the refracted angle of the waves refracted to the fluid 2 from the layer $T_{l1}$ will be $\theta_{21}$. If the velocity of sound in the layer $T_{l1}$ is $C_1$ and that in the fluid 2 is $C_2$, the relationship $$C_1/C_2 = (\sin \theta_{11}/\sin \theta_{21}), \text{ or } \sin \theta_{11}/C_1 = (\sin \theta_{21}/C_2)$$

exists.

The direction of the ultrasonic waves emitted from the oscillator transducer Tv is always perpendicular to the surface $Tv_1$ and thus the incidence angle $\theta_{11}$ of the ultrasonic waves to the surface $T_{l1}$ of the layer $T_l$ is always constant.

If the temperature of the fluid 2 is T°C. and the velocity of sound in the fluid 2 is $C_2$, $$C_1/C_2 = \sin \theta_{11}/\sin \theta_{12}.$$

Then, when the temperature of the fluid 2 varies from T°C. to T'°C. and the velocity of sound in the fluid 2 varies to $C_2'$, if the refraction angle of the ultrasonic waves at this time is $\theta_{21}'$, the relationship $$C_1'/C_2' = (\sin \theta_{21}'/\sin \theta_{11}) \text{ exists.}$$

In this case, the refraction angle $\theta_{21}$ changes to $\theta_{21}'$ due to the temperature change of the fluid 2.

Measurement of the flow rate V of the fluid 2 with the ultrasonic transmitter T and the ultrasonic receiver R identical in construction therewith, which are mounted as shown in FIG. 3 (as in the case of FIG. 1C) is as follows:

If the temperature of the fluid 2 is T°C., the ultrasonic waves emitted from the transmitter T advance in the path $U_T$ (the angle of the path $U_T$ to the flow direction $a_1$ of the fluid 2 is $\theta_{21a}$) and those waves which are reflected by objects 3 such as fine particles in the fluid 2 within the area Sc reach the receiver R along the path $U_R$ (the angle of the path $U_R$ to the flow direction $a_1$ of the fluid 2 which is $\theta_{21a}$). The flow rate V of the fluid 2 is determined by the measuring section II. If the temperature of the fluid 2 changes to T'°C., the path of the ultrasonic waves emitted from the surface $T_{l2}$ of the layer $T_{l1}$ also changes to $U_T'$ (the angle between $U_T'$ and $a_1$ is $\theta_{21a}'$). The ultrasonic waves reflected by the fine particles 3 in an area Sc' reach the receiver R via the path $U_R'$ (the angle between $U_R'$ and $a_1$ is $\theta_{21a}'$).

Thus a change in the temperature of the fluid 2 causes a change in the angle of emission of the waves from the transmitter T (layer $T_{l1}$). Further, the velocity of sound in the fluid 2 also changes from $C_2$ to $C_2'$ even if the flow rate of the fluid is held constant.

Therefore, if the angle $\alpha$ of the surface $Tv_1$ to the surface $T_{l2}$ is so selected to cancel out changes in $\cos\theta_{21a}$ caused by changes in temperature of the fluid 2, in other words caused by the change in sound velocity due to the temperature change of the fluid 2, the relationship $$\cos \theta_{21a}/C_2 = \cos \theta_{21a}'/C_2'$$

will be maintained at all the times. Then, $$2 (\cos\theta_1/C) f_0$$

in the Equation (1) is always constant, so that the flow rate V can be obtained irrespective of the temperature of the fluid 2.

Accordingly, with the present invention, the flow rate of a desired fluid can be measured irrespective of temperature by inclining the front $T_{l2}$ of the layer $T_{l1}$ at a predetermined angle to the direction $U_T$ of emission of the ultrasonic waves from the oscillator transducer Tv in accordance with the temperature coefficient of the velocity of sound in the fluid.

The layer $T_{l1}$ may be formed of, for example, various plastic materials. In acrylate resin the velocity $C_1$ of sound is 2,677 m/s at 0°C. In water the velocity $C_2$ of sound is 1,403 m/s at 0°C. and changes in the velocity of sound due to temperature changes is about 3.5 m/s/°C. The transmitter and receiver are identical in construction and mounted symmetrically and layers in front of the transmitter and receiver should also be mounted at similar angles.

It will be seen that if the focusing lenses $T_l$ and $R_l$ described with FIGS. 1 and 2 are used in combination with the layers $T_{11}$ and $R_{11}$ described with FIGS. 3 and 4, the effects obtainable with the foregoing examples can be simultaneously achieved.

As has been described in the foregoing, the present invention is very useful in that errors, which are caused by fluctuations of the Doppler frequency due to changes in the velocity of sound resulting from changes in the conditions of a fluid, can be eliminated with the simple construction of the invention.

It will be apparent that many modifications and variations may be effected without departing from the scope of the novel concepts of this invention.

I claim

1. An ultrasonic current meter comprising an ultrasonic transmitter, an ultrasonic receiver, a first means for supplying a signal to the ultrasonic transmitter to emit ultrasonic waves therefrom, a second means for producing a signal of a Doppler frequency by combining a signal corresponding to the ultrasonic waves reflected by objects contained in a fluid to be measured but different in acoustic impedance from the fluid with a signal derived from the first means, a means for receiving the signal of the Doppler frequency to indicate the flow rate of the fluid, the ultrasonic transmitter and receiver having mounted in front thereof means for controlling the ultrasonic waves transmitted from the former and received by the latter respectively, the ultrasonic waves controlling means mounted in front of the ultrasonic transmitter and receiver changing the directions of the ultrasonic beams of the transmitter and receiver in response to temperature changes of the fluid, thereby to ensure accurate measurement of the flow rate of the fluid.

2. An ultrasonic current meter as claimed in claim 1 wherein the ultrasonic wave controlling means are prism means.

* * * * *